United States Patent [19]

Smuckler

[11] 4,268,559
[45] May 19, 1981

[54] HEAT-SHRINKABLE ARTICLE

[75] Inventor: Jack H. Smuckler, Marblehead, Mass.

[73] Assignee: Electronized Chemicals Corporation, Burlington, Mass.

[21] Appl. No.: 944,887

[22] Filed: Sep. 22, 1978

[51] Int. Cl.³ .................. B65D 65/42; B32B 3/02
[52] U.S. Cl. ........................ 428/99; 428/36; 428/139; 428/355; 428/447; 138/99; 24/16 PB; 156/85; 156/86
[58] Field of Search .................. 138/99; 285/381; 428/36, 355, 447, 192, 99, 100, 139; 156/85, 86; 24/73 PB, 73 SA, 16 PB, 17 AP

[56] References Cited
U.S. PATENT DOCUMENTS

| 3,379,218 | 4/1968 | Conde | 138/99 |
|---|---|---|---|
| 3,445,898 | 5/1969 | Goodrich | 24/16 PB |
| 3,455,336 | 7/1969 | Ellis | 138/99 |
| 3,530,898 | 9/1970 | Wilson | 138/99 |
| 3,574,313 | 4/1971 | Tanaka | 138/99 |
| 3,654,049 | 4/1972 | Ausnit | 24/16 PB |
| 3,765,329 | 10/1973 | Kirkpatrick | 428/192 |
| 3,770,556 | 11/1973 | Evans | 428/194 |
| 3,910,448 | 10/1975 | Evans | 285/381 |
| 3,959,052 | 5/1976 | Stavek | 428/913 |
| 4,153,747 | 5/1979 | Young | 428/447 |

Primary Examiner—Ellis P. Robinson
Attorney, Agent, or Firm—Russell & Nields

[57] ABSTRACT

Heat-resistant pressure-sensitive adhesives are used to form the closure of a heat-shrinkable wrap-around sleeve. Suitable pressure-sensitive adhesives include silicone-based adhesives and thermosetting adhesives.

7 Claims, 3 Drawing Figures

HEAT-SHRINKABLE ARTICLE

BACKGROUND OF THE INVENTION

This invention relates to heat-shrinkable products which can be employed as seals on damaged pipes and conduits and as insulation on damaged electrical conductors. More particularly, this invention relates to heat-shrinkable products which can function when no free end is available on the article to be protected. Such products are often referred to as wrap-around sleeves. The major obstacle in producing such a sleeve is the development of a closure device which can withstand the forces generated during shrinking at heat recovery temperatures.

U.S. Pat. No. 3,379,218 to Julian S. Conde discloses a heat shrinkable wrap-around sleeve whose closure consists essentially of button holes and buttons. This sleeve has the disadvantage of not being fabricated by the inexpensive extrusion method, but by the more expensive molding method. A further disadvantage of this sleeve is that, of necessity, the button holes and buttons are constructed of the same material as the heat-shrinkable portion. As such, when the sleeve is heated to soften the heat-shrinkable portion for recovery to take place, the button holes and buttons may soften sufficiently so that the closure might fail.

U.S. Pat. No. 3,455,336 to Roger H. Ellis discloses a heat shrinkable wrap-around sleeve whose closure consists of elongated ridges along its edges and a metal channel which slips over the ridges thus engaging the edges. The use of a metal channel has many disadvantages. In order to effect a closure, the long metal fastener must be slid over the two elongated ridges. This is a rather difficult operation, particularly if the closure is a long one. The weight of the wrap-around sleeve tends to pull the two ridges apart before the metal fastener can be slid over them. Further, the fastener can get stuck easily. Also, the resulting closure is a raised strip along the sleeve covered with a metal fastener. If another cable is near the closure, the metal would rub against it causing damage. If the repaired cable has to be moved, the raised metal portion might catch on edges or other obstructions. If the repaired cable is rolled and unrolled as is the case with mine cables, the metal portion would rub against other parts of the cable, causing wear, would tend to catch and would be a safety hazard if it struck a miner. Furthermore, the metal in some instances might cause electrical problems with the cable or other electrical equipment. Some of the problems with the raised metal closure can be overcome by removing the metal fastener. However, after recovery of the sleeving, the fastener is so tightly held in place that it cannot be easily slid off. The alternative is to cut off the protuberances with the metal fastener as well. Not only is this an added time consuming step, but should the repairman cut into the sleeving itself, then the entire repair is useless.

U.S. Pat. No. 3,530,898 to John R. Wilson discloses a heat shrinkable wrap-around sleeve whose closure consists of edges with a plurality of loops and a metal rod which is passed through the loops. This sleeve has the disadvantage of requiring that the body of the sleeving must be cut and folded to produce the loops. A metal rod is required to hold the closure together with the resulting problems as described in regards to the Ellis Patent. But, perhaps the greatest disadvantage of this sleeve is the extreme difficulty encountered when inserting the rod into the loops, especially when the closure is a long one.

U.S. Pat. No. 3,574,313 to Ken Tanaka discloses a heat shrinkable wrap-around sleeve whose closure consists of slots on one edge and preshrunk babs on the other edge. The preshrunk tabs on one edge are inserted into the corresponding slots on the other edge to form the sleeve. This sleeve has the disadvantage of the Conde closure in that the slots and tabs are constructed of the same material as the heat-shrinkable portion. As such, when the sleeve is heated to soften the heat-shrinkable portion for recovery to take place, the slots and tabs may soften sufficiently so that the closure might fail. However, the greatest disadvantage of this sleeve is the extreme difficulty in inserting all the tabs into all the slots especially in a long closure where tabs may slip out of slots while other tabs are being inserted into other slots.

U.S. Pat. No. 3,770,556 to Joseph H. Evans and Gareth W. Will discloses a heat shrinkable wrap-around sleeve whose closure consists of edges which overlap and have been coated with a contact adhesive. To prevent the overlapping edge from peeling back during recovery a restraining member consisting of a metallic foil coated with contact adhesive is adhered to the overlapping edge. This sleeve overcomes many of the disadvantages of the previously-mentioned sleeve. It is simple for the manufacturer to fabricate. It does not require the use of metal fasening devices. It does not rely on the same material as the heat-shrinkable portion of the sleeve for the closure device. However, it overcomes these disadvantages by requiring the user of the sleeve to fabricate in effect his own closure system. This sleeve requires that the user apply contact cement to the two edges of the heat-shrinkable member as well as to a sheet of material used to prevent the edges from peeling back. Should the manufacturer apply the contact cement, then the user is required to use solvents or heat to reactivate the adhesive.

Said U.S. Pat. No. 3,770,556 includes a review of the disadvantages of certain prior-art patents and patent applications, including those hereinabove mentioned. Since said U.S. Pat. No. 3,770,556 is assigned to the assignee of said prior art patents and patent applications, said review of their disadvantages is presumably authoritative. Said U.S. Pat. No. 3,770,556 states, at column 2 lines 13-15: "It had been thought that no adhesive could withstand the force exerted by a heat recovery step at the temperature of recovery," and asserts that the inventors named in said patent discovered that some contact adhesives were potentially capable of withstanding this force, and that such adhesives can be used when peel-back tendencies are overcome.

Specific peel-back-prevention measures mentioned include the use of cross-linking or the use of additional strips of metal or other materials or the use of a thin outer edge. Specific contact adhesives include chloroprene based polymers such as neoprene. All the claims of this patent require separate peel-back prevention means.

In reviewing said prior art patents in the Amendment dated Oct. 10, 1972 and filed Oct. 12, 1972, the applicants in said U.S. Pat. No. 3,770,556 assert (at page 4 thereof): "As pointed out in the Specification of this application, many solutions were found that would provide a suitable wraparound sleeve; however, they all required some mechanical connection between the split edges of the sleeve to enable the sleeve to withstand the substantial forces exerted by the heat recovery of the sleeving material. It is the presence of the effects of recovery that would, and apparently did, dissuade those skilled in the art from attempting to use an adhesive to bond together the two edges of a split sleeve. The effects of recovery are manifested in two ways: first, a substantial shearing force is exerted in the area where the edges of the split sleeve are brought together; second, the uppermost edge of the sleeve tends to peel upwardly and away from the underlying edge. As a result of these effects, the workers in the prior art believed that a mechanical connection was necessary. We submit that it would not be at all obvious to one skilled in the art that an adhesive system could be provided that would withstand these two divergent effects of heat recovery, and withstand them at temperatures approaching 200° C. where adhesive bonds are normally weakened but where a heat recoverable sleeve is typically heated to cause recovery. It was only the applicant's recognition that a specific adhesive system, namely, a contact adhesive, when used in conjunction with means for preventing peel-back, could provide the solution that previously eluded workers skilled in the art.

"Turning now to the claims, all elected claims call for a heat recoverable closure member having areas of a contact adhesive together with means to prevent peeling back of the sleeve. When the closure member is placed about a conductor or other longitudinal member, the areas of contact adhesive may be simply brought together to form a secure bond. None of the patents cited by the Examiner disclose a contact adhesive in any form and, instead, show pressure sensitive or other adhesives which would weaken with heating.

"Contact adhesives are not the same as pressure sensitive adhesives. Pressure sensitive adhesives, typified by the type of adhesives used on adhesive tape or cellophane tape have the characteristic of being sticky to the touch. In contrast, contact adhesives may exhibit little or no stickiness or tackiness until touched with another layer of contact adhesive. Such adhesives are typically applied to each of the two surfaces to be joined and allowed to dry to a relatively tack free state. These two surfaces are then brought together, at which time a tight bond is formed. Thus, they exhibit autoadhesion or the ability to stick to themselves. In contrast, pressure sensitive adhesives will stick to most surfaces and feel sticky to the touch. Contact adhesives are defined in applicants' Specification at page 13, lines 5 through 15 and particular base polymers and formulations are described in the Specification on pages 13 through 19.

"Turning now to the prior art of record, the patent to Carlson suggests the use of a "pressure sensitive adhesive tape" (see Carlson column 1, lines 62–64). Such a tape would not maintain strength at the elevated temperatures necessary to bring about heat shrinking. Thus, if a person faced with applicants' problem of providing a wraparound closure sleeve were given the Carlson reference, he would find that the resulting sleeve would pull apart upon heating. It will now be shown that the secondary references do not supply the deficiencies inherent in the Carlson reference when adapted to applicants' use . . . ."

The foregoing excerpt from arguments made by the applicants of U.S. Pat. No. 3,770,556 show that, until the present applicant's invention disclosed and claimed herein, it was thought that pressure sensitive adhesives were inoperative for use with heat-shrinkable materials.

SUMMARY OF THE INVENTION

If the closure of a wrap-around sleeve could be fabricated by using pressure-sensitive adhesives rather than contact cement, then all the disadvantages of the Evans and Will sleeve would be overcome as well as the disadvantages of the sleeve of Conde, Ellis, Wilson and Tanaka. Such a sleeve would be economical to fabricate and would be extremely easy to use. However, no pressure-sensitive adhesive was thought to have sufficient strength to withstand the forces exerted during heat recovery at the temperature of recovery. I have found two types of such pressure-sensitive adhesives: pressure-sensitive silicone adhesives and thermosetting pressure-sensitive adhesives. I have also found that in order for these pressure-sensitive adhesives to produce a closure sufficiently strong to withstand the shrink forces during recovery at the temperature of recovery, the adhesives must be attached to a heat-stable portion of the wrap-around sleeve. The tenacity of the pressure-sensitive silicone adhesive can be improved further by using a silane primer coat on the heat-stable edges.

One object of this invention is to provide a heat-shrinkable product which performs the function of a heat-shrinkable sleeve yet does not require the presence of a free end on the article to be protected.

Another object is to provide a heat shrinkable wrap-around sleeve whose closure does not require the use of a metal fastener as a closure means.

Another object is to provide a heat shrinkable wrap-around sleeve whose closure does not require the use of the same material as the heat-shrinkable portion of the sleeve.

Still another object is to provide a heat shrinkable wrap-around sleeve whose closure does not require the user to apply contact cements or solvents or use heat to activate contact cements.

Still another object is to provide a heat shrinkable wrap-around sleeve whose closure consists of a heat-resistant pressure-sensitive adhesive which is easier to use than any other closure device hitherto provided.

Yet another object is to provide a heat shrinkable wrap-around sleeve which is easy and inexpensive to manufacture.

Yet another object is to provide a heat shrinkable wrap-around sleeve whose closure consists of a heat-resistant pressure-sensitive adhesive and a locating and holding device to ensure that the pressure-sensitive adhesive is perfectly aligned before joining.

DETAILED DESCRIPTION OF PREFERRED EMBODIMENTS

The foregoing and other objects of the invention will become apparent upon referring to the following detailed description and the accompanying drawings, in which.

Figure 1:
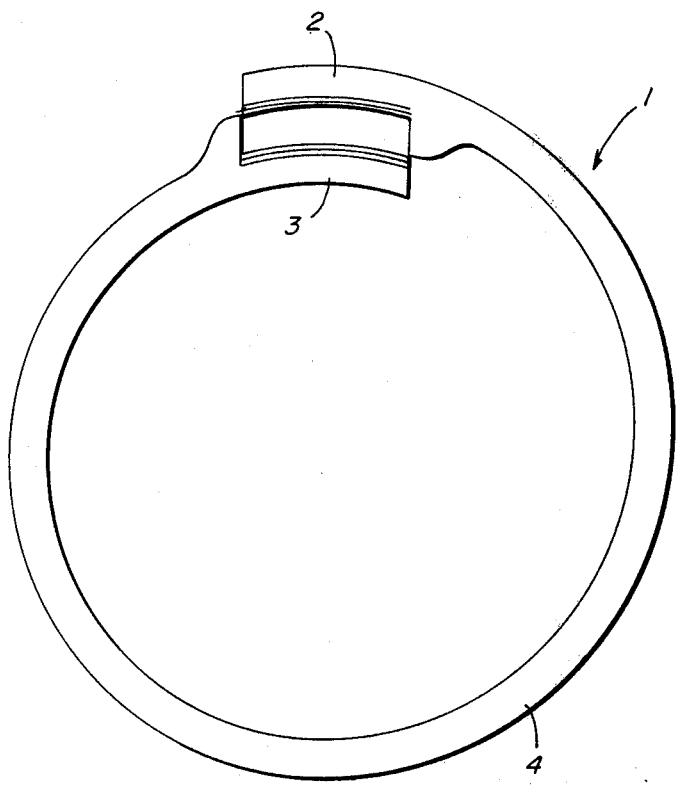
FIG. 1 is a transverse section of a tubular article formed from a heat-shrinkable sheet embodying the invention prior to closure.

Referring to the drawings, and first to FIG. 1 thereof, a sheet 1 of appropriate material, such as polyethylene, is extruded, cross-linked and expanded by conventional techniques. The extruder is so constructed as to give a profile to the sheet, so that the extruded sheet 1 has edges 2, 3 which are half the thickness of the body 4 of the sheet. The extruded sheet 1 is then expanded preferentially; that is, the body 4 is expanded and made heat unstable while the edges 2, 3 remain unexpanded and are therefore heat stable. Such expansion lengthens the body 4 of the sheet 1 and in so doing, reduces its thickness, so that the thickness of the heat-unstable body 4 of the sheet 1 becomes about the same as that of the heat-stable edges 2, 3. Pressure sensitive adhesive tapes 5, 6 with release papers 7, 8 are located on the heat-stable edges 2, 3.

Figure 2:
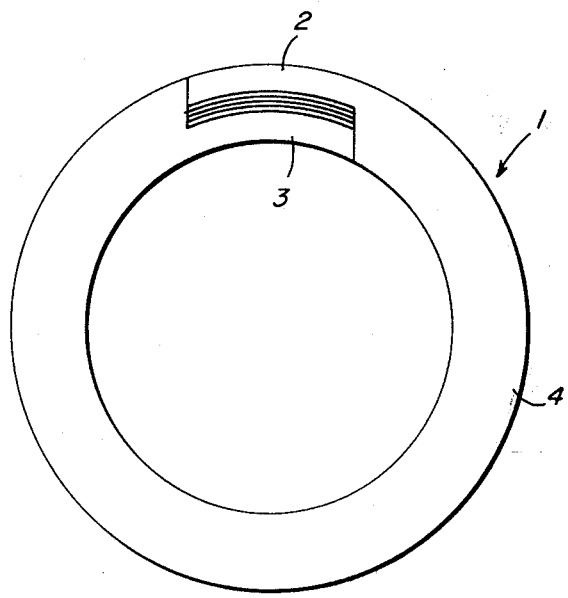
FIG. 2 is a transverse section of the tubular article of FIG. 1 after closure and after recovery.

Referring now to FIG. 2, therein is shown the heat-unstable wrap-around sleeve of FIG. 1 after recovery. During recovery the length of the body 4 of the sheet 1 shortens and, in so doing, increases its thickness, so that the thickness of the heat-stable edges 2, 3 is now about one-half the thickness of the recovered body 4. Consequently, the recovered sleeve has essentially uniform thickness, and a raised edge which might catch or lift during use is avoided.

Figure 3:
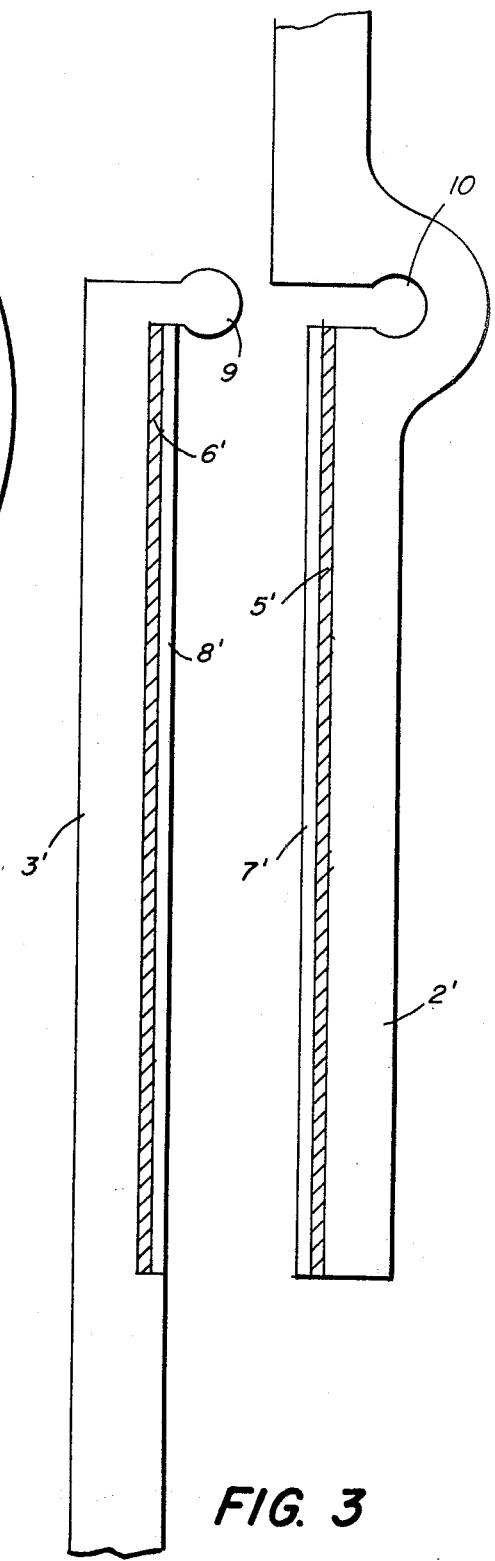
FIG. 3 is a detail of a transverse section similar to that of FIG. 1 showing a preferred embodiment of the invention.

FIG. 3 shows an embodiment of the invention in which the substrate is so designed that an aligning and holding device is built into it. To that end, a raised ridge 9 is produced on the end of heat-stable edge 3'. On an interior portion of heat-stable edge 2', behind pressure-sensitive adhesive tape 5', there is produced a recessed channel 10. The raised ridge 9 and the recessed channel may be produced, for example, by suitable design of the extruder die. Raised ridge 9 is pressed into recessed channel 10 to align and hold the closure together. Once in position, the release papers 7', 8' on the surface of pressure-sensitive adhesive tapes 5', 6' are removed, and the two adhesive tapes 5', 6' now perfectly aligned are pressed together to form a closure ready for heat-shrinking.

Preferably the adhesive tape 5, 6 is a double-coated, pressure-sensitive adhesive tape or else a pressure-sensitive transfer tape. A double-coated tape consists of a sheet of paper, plastic or the like, which has been coated on both sides with a pressure-sensitive adhesive. A release paper as shown at 7, 8 is used on one side so that the tape can be rolled up and unrolled satisfactorily. When the tape is unrolled for use, it sticks to the release paper, exposing one pressure-sensitive surface. The tape can be applied to almost any surface with the release paper protecting the other pressure-sensitive surface. When the second surface is to be used, the release paper is removed and the second pressure-sensitive surface can be applied to whatever surface is desired. In this way, two surfaces can be easily attached to one another. A pressure-sensitive transfer tape consists of a sheet of pressure-sensitive adhesive coated onto a release paper. It functions the same way as a double-coated, pressure sensitive adhesive tape. Many such double-coated or transfer pressure-sensitive tapes are commercially available. In the catalog "Scotch Industrial Tapes" published by the Tape and Allied Products Group of 3M Company, St. Paul, Minnesota are listed over 30 such tapes. Similar tapes are also sold by Nashua Corporation, Nashua, New Hampshire, Permacel Corporation, New Brunswick, New Jersey, The Kendall Company, Boston, Massachusetts, Dennison Manufacturing Company, Framingham, Massachusetts, Bostik Division, USM Corporation, Middleton, Massachusetts, and National Adhesives Division, National Starch and Chemical Corporation, Bridgewater, New Jersey. Double-coated or transfer pressure-sensitive adhesive tapes recommended for high temperature use were obtained from these companies and tested for bond strength at 300° F.

Two substrates for testing the pressure-sensitive adhesive were selected as typical heat shrinkable sleeve materials. One substrate consisted of about 65% polymer of ethylene and vinyl acetate, 30% flame retardants and lesser amounts of antioxidants, radiation sensitizers and processing aid. The material was extruded into a 0.040 inch thick sheet and irradiated at 10 MR. The sheet was cut into 1 by 3 strips. The other substrate consisted of about 73% low-density polyethylene, 22% flame retardants and lesser amounts of antioxidants and stabilizer. The material was extruded into a tube with a 1½ inch outside diameter and a wall thickness of 0.050 inches. The tubing was irradiated at 15 MR, slit longitudinally and the resulting sheet was cut into 1 by 3-inch strips. Specimens for testing the pressure-sensitive tapes were prepared by pressing two 1-inch squares of tape onto two 1 by 3-inch strips of the substrate. The tapes were attached so that they abutted a 1-inch edge of the strip.

Pairs were allowed to build adhesion overnight. The next day the release papers were removed from the pressure-sensitive tapes, and the strips were pressed together, adhesive tape to adhesive tape. The result was a 5-inch long test specimen with a 1-inch square overlapped bonded portion. Specimens were heated at 300° F. in an air circulating oven for 5 minutes and then pulled apart at a rate of 1 inch per minute in an Instron tester equipped with an air circulating oven set at 300° F. The maximum bond strength in pounds per square inch obtained is recorded in Table I.

TABLE I

| BOND STRENGTH AT 300° F. | | | |
|---|---|---|---|
| | | POUNDS PER SQUARE INCH | |
| | | ETHYLENE VINYL ACETATE SUBSTRATE | POLY-ETHYLENE SUBSTRATE |
| POLYKEN | 725 | 1.2 | 1.2 |
| NASHUA | 940 | 0 | 0 |
| NASHUA | 942 | 0 | 0.1 |
| NASHUA | 970 | 1.0 | 0.2 |
| 3M | 465 | 1.7 | 1.7 |
| 3M | 927 | 1.3 | — |
| PERMACEL | P-257 | 3.1 | 2.4 |
| PERMACEL | P-905 | 1.9 | — |
| NATIONAL ADHESIVES | 87-1740 | 1.9 | — |
| BOSTIK | 10-610-2 | 3.2 | — |
| BOSTIK | 10-585-3 | 1.0 | — |
| DENSIL | 1078 | 2.6 | 2.0 |

The pressure-sensitive adhesive tapes which produced the best bond strength at 300° F. were as follows:

| COMPANY | TAPE NUMBER | ADHESIVE TYPE |
|---|---|---|
| PERMACEL | P-257 | Thermosetting rubber/resin |
| PERMACEL | P-905 | Silicone |
| NATIONAL ADHESIVE | TACKMASTER 87-1740 | Thermosetting |
| BOSTIK | 10-610-2 | Thermosetting acrylic |
| DENNISON | DENSIL 1078 | Silicone |

PERMACEL P-905 is a silicone pressure-sensitive adhesive on a polyester film backing with a cloth release liner. Densil 1078 is a phenyl containing silicone pressure sensitive adhesive.

In an effort to improve the bond strength of the Densil tape to the substrate, a number of silane adhesion promoters were evaluated. These silanes produced by Union Carbide Corporation, Chemicals and Plastics Division, New York, New York were dissolved at 1% concentration into isopropyl alcohol and painted onto the substrate described above. Two sheets of substrate were used: one irradiated at 10 MR, the other at 30 MR. In this way, both the effect of silane adhesion promoters and irradiation dosage on Densil bond strength were determined. The bond strength test at 300° F. was run as described above. Results are listed in Table II. These results indicate that the use of silane adhesion promoters, particularly A-1100 and A-1120 increase the hot bond strength of Densil silicone tape to this substrate. Also, the hot bond strength of Densil tape increases with increased irradiation of the substrate.

TABLE II

300° F. Bond Strength of Densil 1078 Tape Pounds Per Square Inch

| PRIMER COAT | 10 MR. SUB-STRATE | 30 MR. SUB-STRATE |
| --- | --- | --- |
| Isopropyl Alcohol | 1.8 | 4.2 |
| Isopropyl Alcohol + 1% A-172 Silane | 1.7 | 4.6* |
| Isopropyl Alcohol + 1% A-174 Silane | 2.0 | 3.9 |
| Isopropyl Alcohol + 1% A-1100 Silane | 2.9* | 5.4* |
| Isopropyl Alcohol + 1% A-1120 Silane | 2.6* | 4.6* |

*The substrate on these samples broke before the bond failed. The other samples were all bond failures.

The substrate for use in producing a heat-shrinkable wrap-around sleeve can be selected from any material which exhibits the property of elastic memory. By elastic memory is meant the property of a material which can be deformed upon heating, and when cooled in the deformed shape will retain the deformed shape, yet when reheated will return to its original undeformed shape. Of particular interest are polymer formulations containing cross-linked crystalline polymers such as polyolefins, olefin copolymers and the like.

An economical, simple way of fabricating a wrap-around sleeve is to extrude a sheet of appropriate material, cross-link it and expand it using a longitudinal stretcher such as the type manufactured by Marshall and Williams Company, Providence, Rhode Island. The sheet can be cut into convenient sizes, and two surfaces along opposite edges recovered by heating. Then, by attaching pressure-sensitive, double-coated or transfer tapes to the recovered, heat-stable upper surface of one edge and the recovered, heat-stable lower surface of the opposite edge, a satisfactory wrap-around sleeve is produced. The user wraps this sleeve around the item to be repaired, attaches the tapes to each other and using heat, shrinks the resulting sleeve to produce the repair. It is possible to use a closure consisting of one tape instead of two; but tapes develop almost instantaneous adhesion to themselves while their adhesion to non-porous plastics tend to build with time. Therefore, it is preferred to use two tapes. Also, if one tape is used, then the closure would require that the tape adhere directly to the surface of the sleeve. If the sleeve got wet or dirty during application, this might interfere with the obtaining of a satisfactory bond. If two tapes are used, each with a release paper to protect its surface, the possibility of obtaining a satisfactory bond is improved.

Another economical, simple way of fabricating a wrap-around sleeve is to extrude a tube, cross-link it and expand it on a tube expander such as the one disclosed in U.S. Pat. No. 3,086,242. The tube can then be slit longitudinally to produce an expanded sheet. This sheet can then be fabricated into a wrap-around sleeve using the procedure described above.

A problem with the above-described wrap-around sleeves is that the entire substrate is the same thickness. As a result, when the sleeve is shrunk down, the portion of the sleeve which is overlapped is at least twice the thickness of the rest of the sleeve. This leaves a raised edge which might catch and lift during use. This problem can be overcome by molding or extruding a profile of the type shown in FIGS. 1 and 2 rather than a simple sheet, the profile having edges which are half the thickness of the rest of the sheet. As noted above, these edges are rendered heat stable, so that pressure-sensitive adhesive tapes can be attached to the heat-stable edges with no concern for the loss of bond strength inherent in heat-unstable substrates.

Still another problem with wrap-around sleeves of the types described above is related to the fact that two pieces of pressure-sensitive adhesive tape are used to form the heat-resistant closure. Although there are many advantages to using two pieces of pressure-sensitive adhesive tape to form the closure, there is one disadvantage. Because the pressure-sensitive adhesive has almost instantaneous adhesion to itself, if the two tapes are misaligned when brought into contact, they are difficult to separate. This problem can be overcome by designing the substrate so that an aligning and holding device is built into it. One form of such a device is shown in FIG. 3 and consists of a raised ridge on the end of one heat-stable edge and a recessed channel on the interior part of the other heat-stable edge. The raised ridge is pressed into the recessed channel before the pressure-sensitive adhesive tapes are pressed together. After the aligning and holding device has been engaged, the release papers are peeled off and the pressure-sensitive adhesive tapes, now perfectly aligned, are pressed together.

The following examples serve to illustrate the invention, but they are not intended to limit it.

EXAMPLE I

The following formulation was prepared in an FCM continuous mixer:

|  | PERCENT |
| --- | --- |
| Ethylene Vinyl Acetate Polymer | 66.4 |
| Flame Retardants | 29.9 |
| Antioxidant | 2.0 |
| Radiation Sensitizer | 1.3 |
| Processing Aid | 0.4 |
|  | 100.0 |

The formulation was extruded to produce a sheet 26-inches wide and 0.040-inch thick. The film was stretched 100% on a longitudinal stretcher produced by the Marshall and Williams Company, Providence, Rhode Island. The film was irradiated at 10 MR after which it had 60% expansion, the remaining stretch having been "locked-in" by the irradiation. A 10 by 4-inch piece, 10 inches in the expanded direction was recovered 1½ inches along its 4-inch edges. The resulting piece was about 9 by 4 inches and had 1-inch wide recovered sections along its 4-inch edges. One-inch wide Densil No. 1078 pressure-sensitive silicone transfer tape with release paper was pressed onto the upper surface of one recovered edge and the lower surface of the other recovered edge to form a wrap-around sleeve. The tape was allowed to build adhesion to the substrate overnight. The next day the release papers were removed from the two pieces of tape, and the tapes were firmly pressed together to form a tube. A pair of cylindrical mandrels 1½ inch and ⅜ inch in diameter were placed into the tube. The tube was shrunk down firmly over the mandrels using a propane torch. The closure held securely even when heated vigorously with the torch.

EXAMPLE II

The following formulation was prepared in an FCM continuous mixer:

|  | PERCENT |
|---|---|
| Low Density Polyethylene | 73.0 |
| Flame Retardants | 21.5 |
| Antioxidant | 3.7 |
| Stabilizer | 1.8 |
|  | 100.0 |

This formulation was extruded to produce a 1½-inch diameter tube with a 0.050-inch thick wall. The tube was irradiated to produce a tube with a modulus at 300° F. of 30 psi. The tube was expanded to a 3-inch diameter and a wall thickness of 0.025 inches. The tube was slit along its center to produce an expanded sheet 9.4-inches wide. Pieces 5-inches long were cut from this sheet. Strips 2-inches wide along the 5-inch edges of the pieces were recovered. The resulting pieces were 7.4 by 5 inches and had 1-inch wide recovered strips along their 5-inch edges. One-inch wide Densil No. 1078 pressure-sensitive silicone transfer tape with release paper was pressed onto the upper surface of one recovered edge, and the lower surface of the other recovered edge to form a wrap-around sleeve. A similar sleeve was made using Permacel P-257 pressure-sensitive, double-coated thermosetting tape. The tapes were allowed to build adhesion to the substrate overnight. The next day the release papers were removed from the two pieces of tape on each sleeve, and the tapes were firmly pressed together to form tubes. A pair of cylindrical mandrels 1½ inches and a ⅜ inch in diameter were placed in the tubes. The tubes were shrunk down firmly over the mandrels using a propane torch. The closures held securely even when heated vigorously with the torch.

EXAMPLE III

The following formulation was prepared on a hot 2-roll mill:

|  | PERCENT |
|---|---|
| Ethylene Vinyl Acetate Polymer | 66.4 |
| Antioxidants | 2.0 |
| Radiation Sensitizer | 1.3 |
| Flame Retardants | 29.9 |
| Processing Aid | 0.4 |
|  | 100.0 |

A sheet of this material was inserted into a compression mold and heated to 300° F. under 20 tons of pressure. After a 10-minute heating cycle and subsequent cooling, a flat plastic part with a profile as shown in FIG. 2 was removed from the mold.

The molded piece was irradiated at 10 MR. At 300° F. this piece had a 100% modulus of 46 psi, a tensile strength of 76 psi, and an elongation at break of 257%. The 1-inch thin sections of the piece were clamped between metal strips using C-clamps. The center portion of the plastic piece was immersed for 5 minutes in a heat-transfer medium heated to 300° F. The metal strips and about a ½-inch long section of the plastic piece were not immersed in the heat-transfer medium. After the heating cycle, the section that had been heated was stretched to twice its length and cooled in the stretched condition. The expanded piece had a profile as shown in FIG. 1.

One-inch wide pressure-sensitive silicone transfer tape with a release paper was attached to the molded piece on the top of one unexpanded edge, and the bottom of the other unexpected edge. Also, a sheet of hot-melt adhesive was attached to the molded piece by wiping it with solvent and pressing it onto the inside surface of the sleeve.

The transfer tapes were allowed to build adhesion to the plastic piece overnight. The next day the plastic piece was wrapped around a 2-inch diameter cable. The hot-melt adhesive side of the piece was against the surface of the cable. The release papers were removed and the silicone transfer tapes were pressed together. The resulting sleeve was shrunk around the cable using a propane torch. The sleeve formed a tight fit around the cable with no slippage of the silicone transfer tapes during the heat-shrinking process.

EXAMPLE IV

The following formulation was prepared on a hot 2-roll mill:

|  | PERCENT |
|---|---|
| Ethylene Vinyl Acetate Polymer | 57.8 |
| Antioxidants | 1.7 |
| Radiation Sensitizer | 1.1 |
| Flame Retardants | 26.0 |
| Processing Aid | 0.4 |
| Reinforcing Filler | 13.0 |
|  | 100.0 |

A sheet of this material was molded in a compression mold at 300° F. under 20 tons of pressure for 10 minutes. After cooling, a plastic part with edges as shown in profile in FIG. 3 was removed from the mold.

The molded piece was irradiated at 4 MR. At 300° F. this material had a 100% modulus of 51 psi, a tensile strength of over 190 psi, and an elongation of over 550%. The piece was expanded as described in Example III. Pressure-sensitive transfer tapes and hot-melt adhesive were applied to the molded piece as described in Example I. The tapes were allowed to build adhesion to the plastic piece overnight.

The plastic piece was wrapped around a 2-inch diameter cable, and the raised portion on one edge was pressed into the cavity near the other edge. This was done easily by snapping one small part of the raised edge into a small part of the cavity and then pressing along. Once the plastic piece was in place, the release papers were removed and the pressure-sensitive silicone transfer tapes were pressed together. The resulting sleeve was shrunk around the cable using a propane torch. The sleeve formed a tight fit around the cable.

The closure held securely even when heated vigorously with the torch.

EXAMPLES V, VI, VII AND VIII

Sleeves were prepared using the formulation and procedure described in Example IV, except instead of using Densil pressure-sensitive transfer tapes, the following pressure-sensitive tapes were used:
  a. Permacel P-257, thermosetting tape.
  b. Permacel P-905, silicone tape.
  c. Mational Adhesive, Tackmaster 87-1740, thermosetting transfer tape.
  d. Bostik 10-610-2, thermosetting transfer tape.

As in Example IV, the plastic pieces were wrapped around a 2-inch diameter cable, and the raised portion on one edge was pressed into the cavity near the other edge. Once the plastic piece was in place, the release papers were removed, and the pressure-sensitive tapes were pressed together. The resulting sleeve was shrunk around the cable using a propane torch. In each case the sleeve formed a tight fit around the cable, and the closure held securely even when heated vigorously with the torch.

The molded parts used in Example III and IV to produce wrap-around sleeves are designed to be fabricated by the more economical extrusion process. However, for production of small quantities for laboratory experimental use, it is more convenient to produce these parts by the compression molding process.

I claim:

1. A heat-shrinkable article comprising a heat-shrinkable sheet having two edges adapted to form a closure, said edges being heat-stable, at least one of said edges having thereon a silicone-based pressure sensitive adhesive adapted, after compression against the other of said edges to form a closure, to maintain said closure at a temperature sufficiently high to shrink said heat-shrinkable sheet.

2. A heat-shrinkable article in accordance with claim 1, wherein said edges have mating portions so formed that, after formation of said closure and shrinking of said heat-shrinkable sheet, said closure is not significantly thicker than said sheet.

3. A heat-shrinkable article in accordance with claim 1, wherein said edges contain a built-in aligning and holding device.

4. A heat-shrinkable article in accordance with claim 1, wherein silicone is used to produce greater high temperature adhesion.

5. A heat-shrinkable article in accordance with claim 1, wherein said heat-shrinkable sheet has been irradiated to a dosage substantially greater than that required to impart heat-shrinkable properties thereto.

6. A process for making a heat-shrinkable article comprising the following steps: forming a heat-shrinkable sheet having two edges adapted to form a closure, said edges being heat-stable, and pressing against at least one of said edges a silicone-based pressure-sensitive adhesive adapted, after compression against the other of said edges to form a closure, to maintain said closure at a temperature sufficiently high to shrink said heat-shrinkable sheet.

7. A process for ensleeving an article comprising the following steps: wrapping about an article to be ensleeved a heat-shrinkable article comprising a heat-shrinkable sheet having two edges adapted to form a closure, said edges being heat-stable, at least one of said edges having thereon a silicone-based pressure sensitive adhesive adapted, after compression against the other of said edges to form a closure, to maintain said closure at a temperature sufficiently high to shrink said heat-shrinkable sheet, compressing said two edges together so as to form a closure, and heating said heat-shrinkable article to a temperature sufficiently high to shrink said heat-shrinkable sheet.

* * * * *